(12) United States Patent
Liu et al.

(10) Patent No.: US 9,545,681 B2
(45) Date of Patent: Jan. 17, 2017

(54) AUTOMATIC WIRE CONNECTING DEVICE

(75) Inventors: Zhengyong Liu, Tokyo (JP); Rintaro Nagaoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 597 days.

(21) Appl. No.: 13/981,246

(22) PCT Filed: Jan. 20, 2012

(86) PCT No.: PCT/JP2012/051258
§ 371 (c)(1),
(2), (4) Date: Jul. 23, 2013

(87) PCT Pub. No.: WO2012/108250
PCT Pub. Date: Aug. 16, 2012

(65) Prior Publication Data
US 2013/0299459 A1  Nov. 14, 2013

(30) Foreign Application Priority Data

Feb. 7, 2011 (JP) ................................. 2011-024274

(51) Int. Cl.
 *B23H 7/10* (2006.01)
 *B23H 7/08* (2006.01)

(52) U.S. Cl.
 CPC ............... *B23H 7/104* (2013.01); *B23H 7/08* (2013.01); *B23H 7/10* (2013.01); *B23H 7/102* (2013.01)

(58) Field of Classification Search
 CPC ............. B23H 7/10; B23H 7/104; B23H 7/04; B23H 7/08; B23H 7/102
 USPC ........................................... 219/69.12, 69.13
 See application file for complete search history.

(56) References Cited

U.S. PATENT DOCUMENTS

| | | | | |
|---|---|---|---|---|
| 3,857,013 A | * | 12/1974 | Niesse | B23K 1/0004 219/108 |
| 4,392,195 A | * | 7/1983 | Inoue | B23H 7/065 219/69.12 |
| 6,979,794 B1 | | 12/2005 | Nakashima et al. | |

FOREIGN PATENT DOCUMENTS

| | | |
|---|---|---|
| JP | 49-1417 A | 1/1974 |
| JP | 58-132421 A | 8/1983 |
| JP | 60-228029 A | 11/1985 |
| JP | 9-137233 A | 5/1997 |
| JP | 10-17942 A | 1/1998 |
| JP | 2003-94253 A | 4/2003 |

(Continued)

OTHER PUBLICATIONS

International Search Report issued Apr. 24, 2012, in PCT/JP2012/051258.

*Primary Examiner* — Brian Jennison
(74) *Attorney, Agent, or Firm* — Oblon, McClelland, Maier & Neustadt, L.L.P.

(57) ABSTRACT

An automatic wire connecting device includes a heating electrode that heats an electrode wire by applying a current to the electrode wire, a tension applying unit that applies a tension to the electrode wire to which the current is applied by the heating electrode, a tension control unit that controls the tension applied by the tension applying unit, and a power supply control unit that applies a heating current smaller than a preset annealing current to the electrode wire until a first set time elapses since the current starts to be applied and increases the current applied to the electrode wire to reach the annealing current during a second set time after the first set time elapses since the current starts to be applied.

8 Claims, 13 Drawing Sheets

(56) References Cited

FOREIGN PATENT DOCUMENTS

| | | | |
|---|---|---|---|
| JP | 2003-94254 | A | 4/2003 |
| JP | 2003-285227 | A | 10/2003 |
| JP | 2006-7400 | A | 1/2006 |

\* cited by examiner

AUTOMATIC WIRE CONNECTING DEVICE

FIELD

The present invention relates to an automatic wire connecting device of a wire electrical discharge machine.

BACKGROUND

A wire electrical discharge machine exists that causes an electrode wire composed of a metallic wire to face a workpiece with a minute gap therebetween and performs a cutting process on the workpiece by using discharge energy. An important part of the technology for realizing automation of wire electrical discharge machining is an automatic wire connecting device that passes the electrode wire through a machining start hole of a workpiece before machining is started.

With the use of an automatic wire connecting device, when an electrode wire is broken during machining, machining can be resumed by reconnecting the electrode wire. Moreover, an electrode wire can be automatically inserted into a different machining position of the same machining material or into a new workpiece supplied after machining is finished. Therefore, a wire electrical discharge machine can be operated unattended anytime.

In order to realize the automatic connection function of an electrode wire, an electrode wire needs to be automatically passed from the upper wire guide to the lower wire guide through a groove or a prepared hole of a workpiece. However, the electrode wire is wound on the bobbin before being connected and therefore becomes curled due to the way it is wound on the bobbin. Therefore, the tip of the electrode wire deviates from the groove or the hole and thus cannot be inserted into the prepared hole or the like in some cases.

In view of the above, the straightness of an electrode wire is improved by performing a heating process (annealing) by applying current to the electrode wire before the electrode wire is inserted. When annealing is performed, the temperature of the electrode wire increases; therefore, thermal expansion occurs due to the heating and the electrode wire is deflected. If annealing is performed on the bent electrode wire without removing the deflection due to the thermal expansion, the straightness of the electrode wire cannot be improved. In order to perform annealing while keeping the electrode wire straight, there is a technology, for example, as disclosed in Patent Literature 1, in which a heating process is performed while applying tension to the electrode wire.

CITATION LIST

Patent Literature

Patent Literature 1: Japanese Patent Application Laid-open 2003-94254

SUMMARY

Technical Problem

According to the conventional technology described above, when the electrode wire is straightened by annealing, the electrode wire is heated by applying current while being kept straight by having tension applied to it. The strength of the electrode wire decreases with the increase in temperature due to heating; therefore, breaking easily occurs due to the external force, such as tension. Particularly, when a thin electrode wire of ϕ0.1 mm or less is used, breaking easily occurs. Moreover, even if a relatively thick electrode wire of ϕ0.1 mm or more is used, if excessive tension is applied to the electrode wire during annealing, breaking occurs.

On the other hand, when tension cannot be applied to the electrode wire, a thermally expanded portion of the electrode wire due to heating cannot be rolled up by the tension setting roller or the like. Thus, the electrode wire is heated in a state where deflection remains therein; therefore, there is a problem in that the desired straightness of the electrode wire cannot be obtained.

The present invention is achieved in view of the above and has an object to obtain an automatic wire connecting device capable of improving the straightness of an electrode wire while suppressing breaking of the electrode wire.

Solution to Problem

In order to solve above-mentioned problems and achieve the object, according to an aspect of the present invention, there is provided an automatic wire connecting device that performs a heating process while applying a tension to an electrode wire, including a heating electrode that heats the electrode wire by applying a current to the electrode wire; a tension applying unit that applies the tension to the electrode wire to which the current is applied by the heating electrode; a tension control unit that controls the tension applied by the tension applying unit; and a power supply control unit that applies a heating current smaller than a preset annealing current to the electrode wire until a first set time elapses since the current starts to be applied and increases the current applied to the electrode wire to reach the annealing current during a second set time after the first set time elapses since the current starts to be applied.

Advantageous Effects of Invention

According to the present invention, an advantageous effect is obtained where the straightness of an electrode wire can be improved while suppressing breaking of the electrode wire.

BRIEF DESCRIPTION OF DRAWINGS

FIG. 2-1 is a diagram illustrating a relationship between an amount of thermal expansion due to an increase in temperature when an electrode wire is heated by a constant current and a time from when an annealing process is started.

FIG. 2-2 is a diagram illustrating the relationship between the thermal expansion rate due to the increase in temperature when an electrode wire is heated by a constant current and the time from when the annealing process is started.

FIG. 2-3 is a diagram illustrating the relationship between the thermal expansion acceleration due to the increase in temperature when an electrode wire is heated by a constant current and the time from when the annealing process is started.

FIG. 3-1 is a diagram illustrating the relationship between the amount of thermal expansion due to the increase in temperature when an electrode wire is heated by a constant current and the time from when the annealing process is started with respect to the amount of rotation of a tension setting roller when the set tension value is small.

FIG. 3-2 is a diagram illustrating the relationship between the thermal expansion rate due to the increase in temperature when an electrode wire is heated by a constant current and the time from when the annealing process is started with respect to the roll-up rate of the tension setting roller when the set tension value is small.

FIG. 3-3 is a diagram illustrating the relationship between the thermal expansion acceleration due to the increase in temperature when an electrode wire is heated by a constant current and the time from when the annealing process is started with respect to the acceleration of the tension setting roller when the set tension value is small.

FIG. 8-1 is a diagram illustrating the relationship between the tension applied to an electrode wire and the time from when annealing is started with respect to the torque command value from the torque control device, in the case where the torque command value from the torque control device is constant.

FIG. 8-2 is a diagram illustrating the relationship between the tension applied to an electrode wire and the time from when annealing is started with respect to the torque command value from the torque control device, in the case where the torque command value from the torque control device is variable.

FIG. 10-1 is a diagram illustrating the relationship between the current that is applied to an electrode wire and the heating time in the case where the current during annealing is constant, the case where the current that is applied to an electrode wire is rapidly increased, and the case where the current that is applied to an electrode wire is gradually increased.

FIG. 10-2 is a diagram comparing the amount of thermal expansion among the case where the current during annealing is constant, the case where the current that is applied to an electrode wire is rapidly increased, and the case where the current that is applied to an electrode wire is gradually increased.

FIG. 10-3 is a diagram comparing the thermal expansion rate among the case where the current during annealing is constant, the case where the current that is applied to an electrode wire is rapidly increased, and the case where the current that is applied to an electrode wire is gradually increased.

FIG. 10-4 is a diagram comparing the thermal expansion acceleration among the case where the current during annealing is constant, the case where the current that is applied to an electrode wire is rapidly increased, and the case where the current that is applied to an electrode wire is gradually increased.

DESCRIPTION OF EMBODIMENTS

An automatic connecting device according to embodiments of the present invention will be described in detail below with reference to the drawings. The present invention is not limited to these embodiments.

[Overall Configuration of Automatic Wire Connecting Device]

Figure 1:
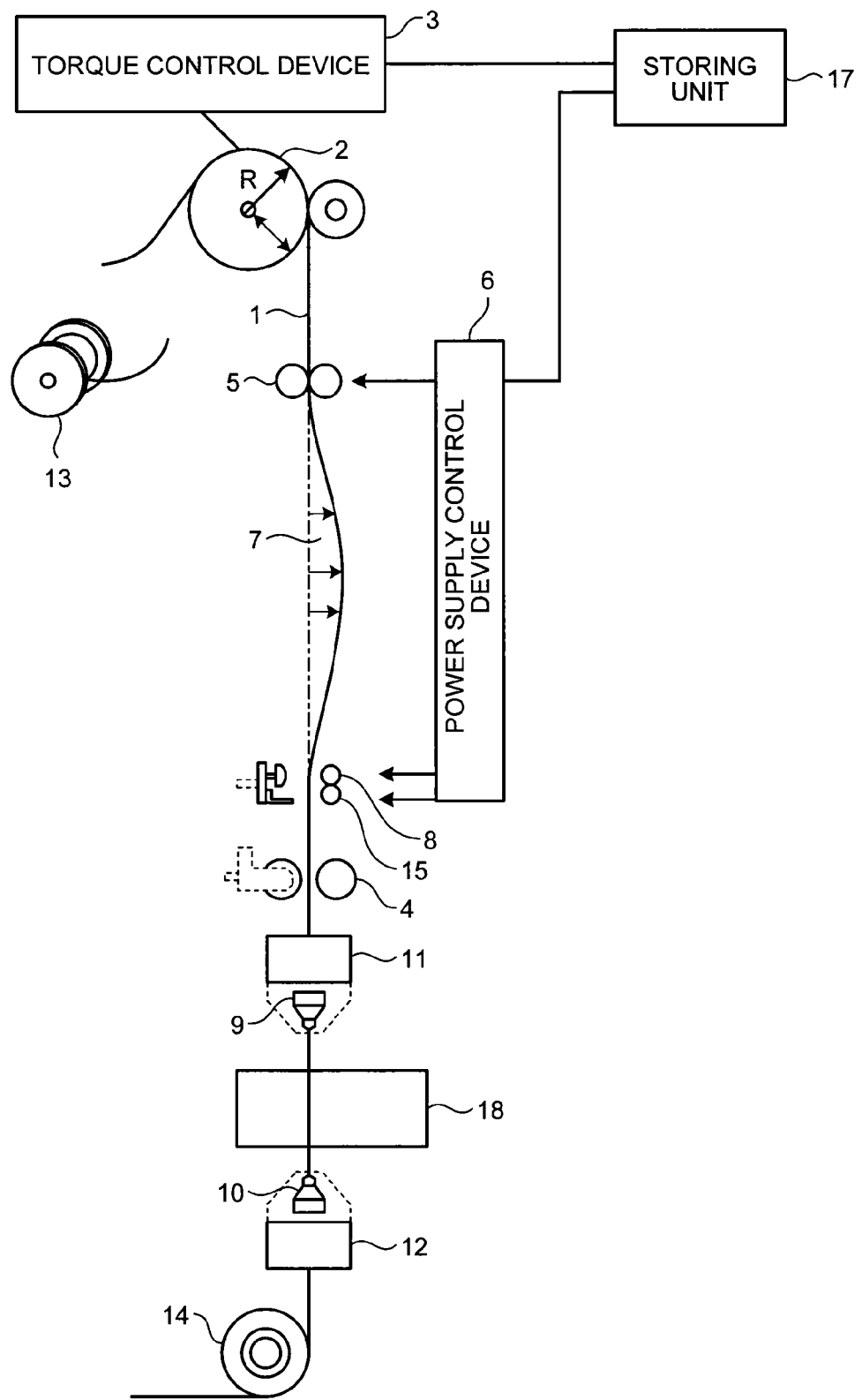
FIG. 1 is a configuration diagram illustrating the outline of an automatic wire connecting device of a wire electrical discharge machine.

FIG. 1 is a configuration diagram illustrating the outline of an automatic wire connecting device of a wire electrical discharge machine according to the embodiments of the present invention. In FIG. 1, an electrode wire 1 passes a tension setting roller (tension applying unit) 2, an upper power feed contact 11, an upper wire guide 9, a lower wire guide 10, and a lower power feed contact 12, thereafter, has its direction changed by approximately 90° by a lower guide roller 14, and is conveyed to an electrode wire collecting device (not illustrated) provided on the back surface of the wire electrical discharge machine.

Until being supplied to the automatic wire connecting device, the electrode wire 1 is wound on a bobbin 13; therefore, the electrode wire 1 is curled due to the way it is wound on the bobbin 13. Therefore, when the electrode wire 1 is automatically connected, first, the curl of the electrode wire 1 is removed by annealing the electrode wire 1, i.e., the electrode wire 1 is straightened. When the electrode wire 1 is annealed, the electrode wire 1 is fixed by closing a pinch roller 4. Then, a torque control device (tension control unit) 3 sends a torque command to the tension setting roller 2 such that the required tension is applied to the electrode wire 1 between the tension setting roller 2 and a cutting electrode 8.

Thereafter, a heating current electrode (heating electrode) 5, a GND electrode 15, and the cutting electrode 8 are connected to the electrode wire 1, and a power supply control device (power supply control unit) 6 applies current between the heating current electrode 5 and the GND electrode 15, thereby performing an annealing process.

After the annealing process is finished, the power supply control device 6 applies current between the cutting electrode 8 and the GND electrode 15, thereby performing a fusing process on the electrode wire 1. After the fusing process is finished, the heating current electrode 5, the cutting electrode 8, and the GND electrode 15 are separated from the electrode wire 1 and the pinch roller 4 is released.

The tip portion of the electrode wire 1 cut by the fusing process is removed by a cut wire collecting device (not illustrated). Thereafter, the annealed electrode wire 1 passes the upper power feed contact 11, exits the upper wire guide 9, and is inserted into the lower wire guide 10.

The electrode wire 1 that has passed the lower power feed contact 12 has its travelling direction changed from the vertical direction to the horizontal direction by the lower guide roller 14 and is collected by the electrode wire collecting device (not illustrated) provided on the back surface of the machine, whereby the automatic connection ends. The wire electrical discharge machine cuts a workpiece 18 between the upper wire guide 9 and the lower wire guide 10 by using the discharge energy from the electrode wire 1.

First Embodiment

Next, an explanation will be given of the first embodiment of the present invention that is applied to the above-described automatic wire connecting device. Specifically, an explanation will be given of an automatic wire connecting device that performs the annealing process by applying current to the electrode wire 1 between the heating current electrode 5 and the GND electrode 15 and applying tension to the electrode wire 1 while controlling the tension applied to the electrode wire 1 by the torque control device 3 such that there is substantially no deflection.

When current flows in the electrode wire 1, the electrode wire 1 generates heat due to the resistance of the electrode wire 1 and thus the temperature of the electrode wire 1 increases. However, heat transfer also occurs due to the temperature difference between the electrode wire 1 and the environment. When the electrode wire 1 is heated by applying current, the temperature of the electrode wire 1 first increases rapidly; however, the amount of heat transfer also increases due to the temperature difference between the electrode wire 1 and the environment after a lapse of a certain period of time. Therefore, the temperature of the electrode wire 1 settles within a certain range.

Figures 1, 2:
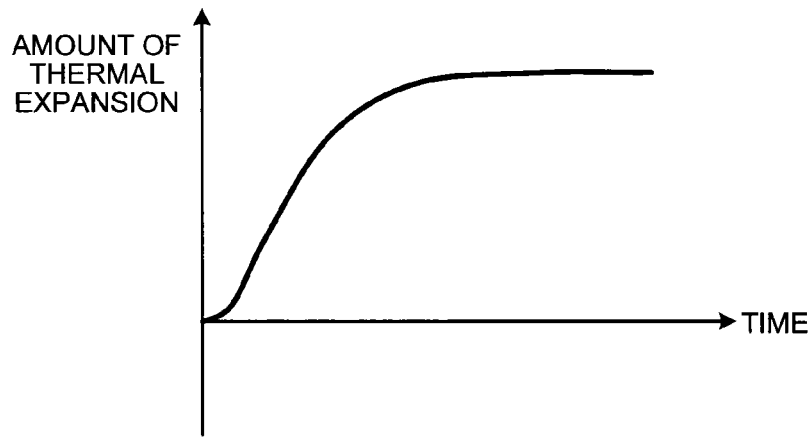
Figure 2:
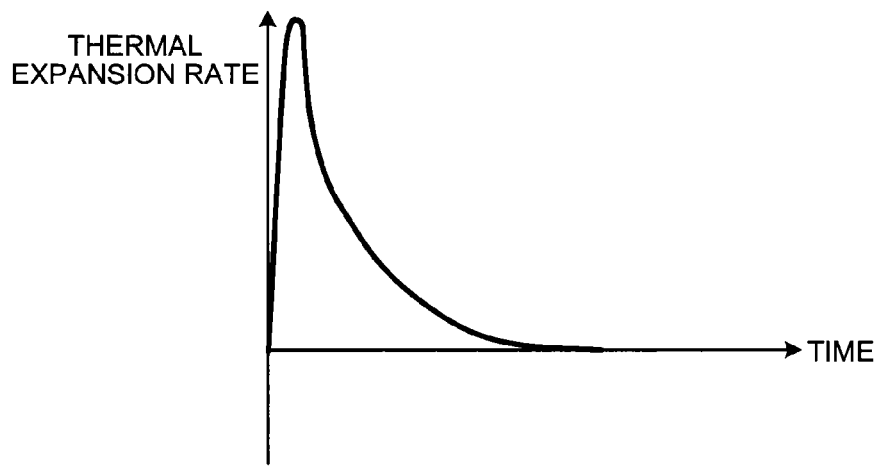
Figures 2, 3:
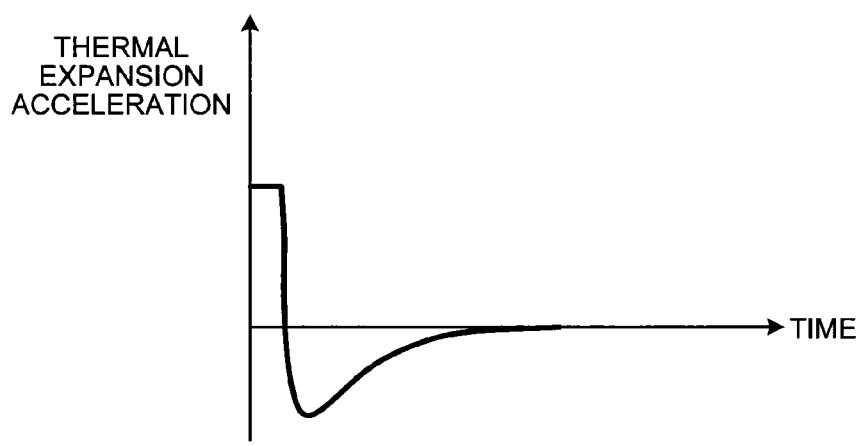
Figures 1, 3:
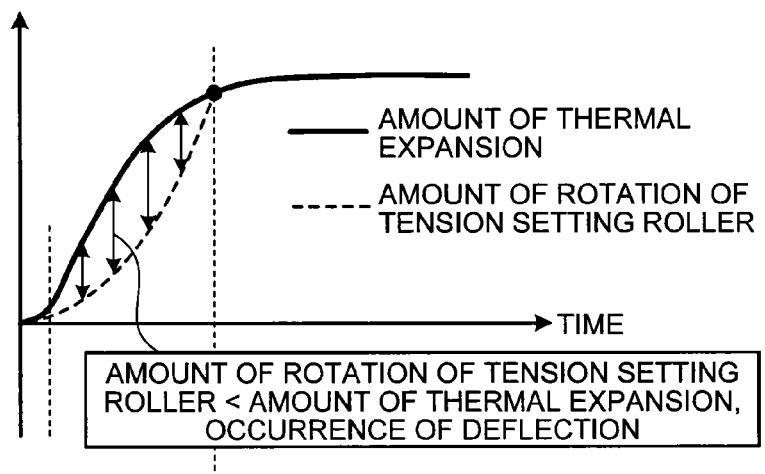
Figures 2, 3:
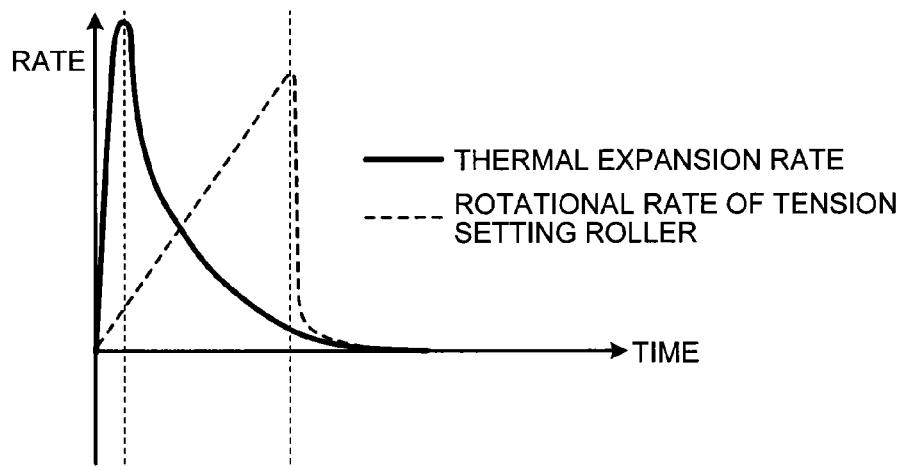
Figure 3:
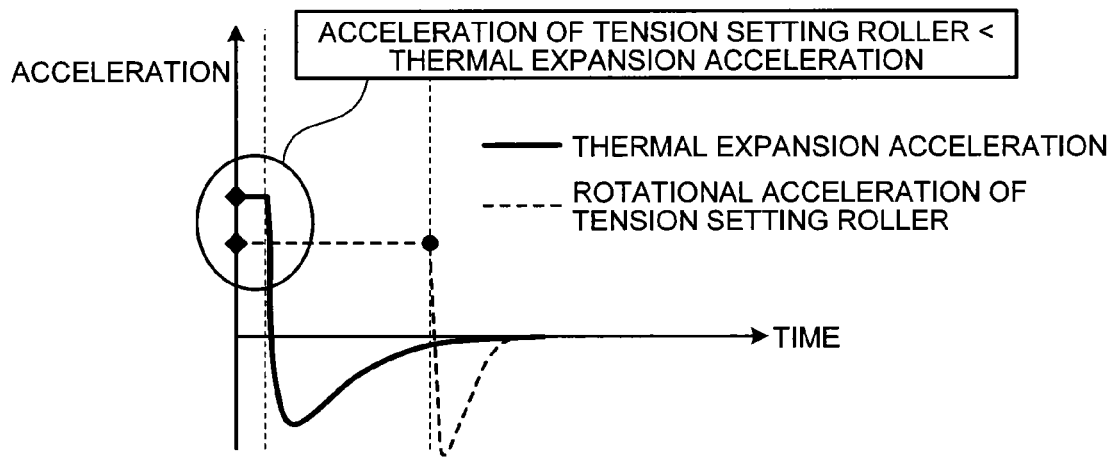

When the temperature of the electrode wire 1 increases, thermal expansion occurs due to the heating. FIG. 2-1 is a diagram illustrating the relationship between the amount of thermal expansion due to the increase in temperature when the electrode wire 1 is heated by a constant current and the time from when annealing is started. The horizontal axis indicates the time from when annealing is started. The vertical axis indicates the amount of thermal expansion. FIG. 2-2 is a diagram illustrating the relationship between the thermal expansion rate due to the increase in temperature when the electrode wire 1 is heated by a constant current and the time from when the annealing process is started. FIG. 2-3 is a diagram illustrating the relationship between the thermal expansion acceleration due to the increase in temperature when the electrode wire 1 is heated by a constant current and the time from when the annealing process is started.

FIG. 3-1 is a diagram illustrating the relationship between the amount of thermal expansion due to the increase in temperature when the electrode wire 1 is heated by a constant current and the time from when annealing is started with respect to the amount of rotation of the tension setting roller 2 when the set tension value is small. FIG. 3-2 is a diagram illustrating the relationship between the thermal expansion rate due to the increase in temperature when the electrode wire 1 is heated by a constant current and the time from when the annealing process is started with respect to the roll-up rate of the tension setting roller 2 when the set tension value is small. FIG. 3-3 is a diagram illustrating the relationship between the thermal expansion acceleration due to the increase in temperature when the electrode wire is heated by a constant current and the time from when the annealing process is started with respect to the acceleration of the tension setting roller 2 when the set tension value is small.

As illustrated in FIG. 2-3, because the temperature increases rapidly immediately after current starts to be applied, the thermal expansion acceleration of the electrode wire 1 also becomes high. At this time, if the torque command value of the torque control device 3 is too small, the torque applied to the tension setting roller 2 becomes too small; therefore, as illustrated in FIG. 3-3, the acceleration of the tension setting roller 2 becomes lower than the acceleration of the thermal expansion due to the increase in temperature of the electrode wire 1. Therefore, as illustrated in FIG. 3-1, the amount of rotation of the tension setting roller 2 becomes less than the amount of expansion of the electrode wire 1 due to heating. Thus, deflection caused by heating cannot be rolled up.

In this case, the electrode wire 1 is heated in a state where deflection remains therein; therefore, the electrode wire 1 cannot be sufficiently straightened in some cases. On the other hand, the strength of the electrode wire 1 decreases with the increase in temperature due to heating. Therefore, particularly, in the case of the thin electrode wire 1 of ϕ0.1 mm or less, breaking easily occurs due to the external force, such as tension. Moreover, even in the case of the relatively thick electrode wire 1 of ϕ0.1 mm or more, if an excessive tension is applied to the electrode wire 1 during the annealing process, a breaking may occur.

To counter the above, in the present invention, in order to prevent both deflection and breaking from occurring, the torque applied to the tension setting roller 2 is changed by the torque control device 3. An explanation will be given below of the calculation of the torque applied to the tension setting roller 2.

The command value of the torque applied to the tension setting roller 2 by the torque control device 3 is defined as $\tau$, and the tension actually applied to the electrode wire 1 is defined as $T_w$. In this case, the equation of motion for the tension setting roller 2 is represented as follows:

$$\tau - T_w \times R - \tau_M = J \times \alpha \quad (1)$$

where $\tau_M$ is the friction torque, J is a moment of inertia of the tension setting roller 2, $\alpha$ is an angular acceleration of the tension setting roller 2, and R is a radius of the tension setting roller 2. When the tension setting roller 2 can roll up all of the expansion of the electrode wire 1, the following equation is satisfied between the acceleration a of the thermal expansion of the electrode wire 1 and the radius R of the tension setting roller 2.

$$a = R \times \alpha \quad (2)$$

From the above two equations, the torque applied to the tension setting roller 2 can be obtained by the following equation.

$$\tau = T_w \times R + J \times a/R + \tau_M \quad (3)$$

On the other hand, in order to completely roll up the thermal expansion, i.e., in order to prevent deflection from occurring in the electrode wire 1, after heating is started, tension needs to be always applied to the electrode wire 1. In other words, the following equation needs to be satisfied.

$$T_w \geq 0 \quad (4)$$

From Equation (3) and Equation (4), the torque necessary for the tension setting roller 2 when the electrode wire 1 is not deflected is represented by the following equation.

$$\tau \geq J \times a/R + \tau_M \quad (5)$$

From Equation (5), when the electrode wire 1 is annealed, it is possible to clarify the relationship between the torque $\tau$, which is applied to the tension setting roller 2 and by which the thermal expansion due to the heating can be taken up, and the expansion acceleration of the electrode wire 1 due to the heating. The torque that is first applied to the tension setting roller 2 such that the thermal expansion due to heating can be taken up is defined as $\tau_1$ and the value of $\tau_1$ is derived from Equation (5), whereby the electrode wire 1 can be prevented from being deflected.

Moreover, from Equation (3), the tension $T_w$ applied to the electrode wire 1 is represented by the following equation.

$$T_w = (\tau - J \times a/R - \tau_M)/R \quad (6)$$

From Equation (6), it is possible to recognize the relationship between the command value $\tau$ of the torque and the acceleration a of the thermal expansion of the electrode wire 1 due to the increase in temperature at the tension $T_w$ applied to the electrode wire 1.

Next, as illustrated in FIG. 2-2, the thermal expansion rate first increases rapidly; however, the thermal expansion rate of the electrode wire 1 gradually decreases with the increase in temperature, and the thermal expansion acceleration a in Equation (6) also becomes negative (also see FIG. 2-3).

Figures 1, 8:
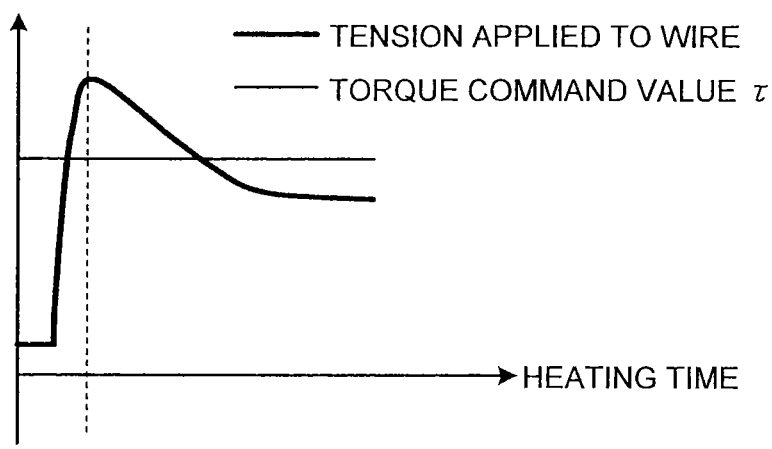
Figures 2, 8:
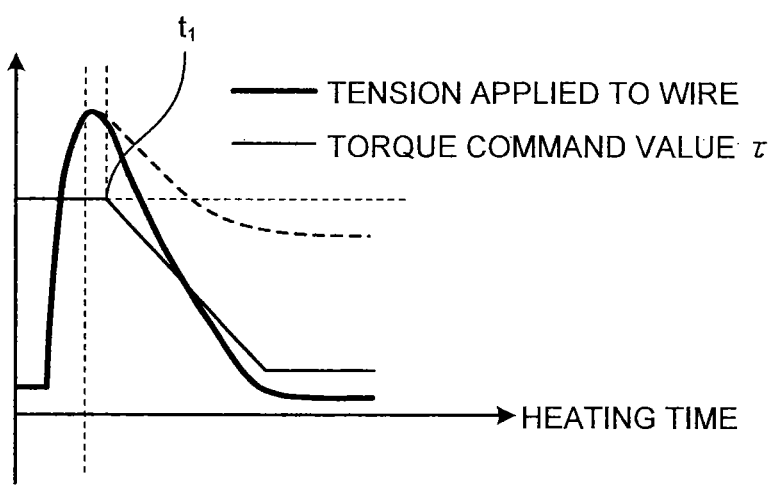

FIG. 8-1 illustrates the tension applied to the electrode wire 1. The strength of the electrode wire 1 decreases with the increase in temperature due to heating. Therefore, if the torque $\tau_1$, which is first applied to the tension setting roller 2, continues to be applied, the electrode wire 1 is easily broken. Particularly, when the wire diameter of the electrode wire 1 becomes small, the strength thereof decreases and the electrode wire 1 is more likely to be broken.

Therefore, the tension applied to the electrode wire 1 is reduced to the tension with which the electrode wire 1 can be kept straight by changing the command value $\tau$ of the torque applied to the tension setting roller 2 by the torque control device 3. Thus, the electrode wire 1 can be prevented from being broken while sufficiently increasing the temperature of the electrode wire 1 and the electrode wire 1 can be further sufficiently straightened.

For example, when the elapsed time since annealing of the electrode wire 1 is started has reached the time $t_1$, the torque command given to the tension setting roller 2 from the torque control device 3 may be changed from $\tau_1$ as follows:

$$\tau = \begin{cases} \tau_1 & (t \leq t_1) \\ \tau_1 - (\tau_1 - \tau_2) \times (t - t_1)/t_2 & (t_1 < t \leq t_1 + t_2) \\ \tau_2 & (t_1 + t_2 < t \leq T) \end{cases} \quad (7)$$

where T is the time between the start and end of annealing and $\tau_2$ is the torque command from the torque control device 3 when annealing ends. $\tau_2$ needs to be set equal to or more than the friction torque. This is because if $\tau_2$ is equal to or less than the friction torque, as illustrated in Equation (6), the tension $T_w$ applied to the electrode wire 1 does not become negative due to the friction. If $\tau_2$ is equal to or less than the friction torque, the roller does not move; therefore, deflection that occurs when the temperature is further increased is not removed and thus the electrode wire 1 is bent. $t_1$ and $t_2$ will be described below.

$t_1$ is the time from when the annealing process is started to when changing of the torque command is started and needs to be set within a certain range. As illustrated in FIG. 2-3, because the temperature increases rapidly immediately after current starts to be applied, the thermal expansion acceleration of the electrode wire 1 also becomes high. At this time, if the command value $\tau$ of the torque applied to the tension setting roller 2 by the torque control device 3 is changed to $\tau_2$ instantaneously, as illustrated in FIG. 3-1, the amount of rotation of the tension setting roller 2 becomes less than the amount of expansion of the electrode wire 1 due to heating. Thus, deflection caused by heating cannot be rolled up. Therefore, $t_1$ needs to be set when or after the thermal expansion acceleration a becomes negative (also see FIG. 2-3).

Figure 12:
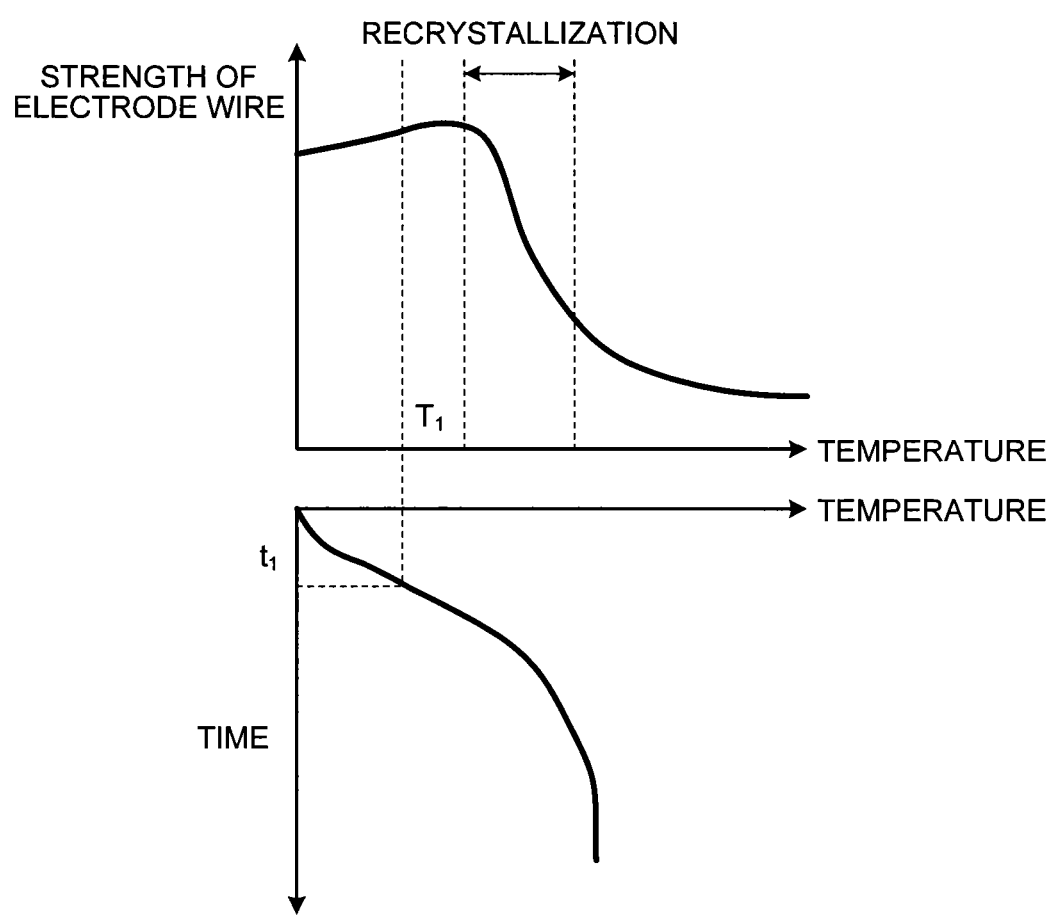
FIG. 12 is a diagram illustrating the relationship between the strength change of an electrode wire due to the increase in temperature when the electrode wire is heated by a constant current and the time from when the annealing process is started.

On the other hand, the strength of the electrode wire 1 decreases with the increase in temperature due to heating. Therefore, if the time $t_1$, during which the torque $\tau_1$, which is first applied to the tension setting roller 2, continues to be applied, is set too long, the electrode wire 1 is easily broken. Thus, $t_1$ needs to be set before the strength of the electrode wire starts decreasing. For example, in the case where the material of the electrode wire 1 is brass, as illustrated in FIG. 12, when the temperature of the electrode wire 1 reaches around the temperature (300° C. to 400° C.) that is referred to as the recrystallization temperature, the strength decreases rapidly. Thus, $t_1$ is set right before the strength of the electrode wire 1 starts decreasing.

For example, the temperature of the electrode wire 1 is measured by a temperature sensor, and the time until the temperature of the electrode wire 1 reaches the recrystallization temperature after annealing is started is defined as $t_R$. Alternatively, the amount of thermal expansion of the electrode wire 1 due to the increase in temperature of the electrode wire 1 is detected by an encoder or the like of the tension setting roller 2, and the time $t_R$ until the temperature of the electrode wire 1 reaches the recrystallization temperature after annealing is started is determined on the basis of the amount of thermal expansion of the electrode wire 1. The value of $t_R$ without being changed can be set as the set value of $t_1$ or a value slightly smaller than $t_R$ can be set as the set value of $t_1$.

Moreover, $t_2$ is the time (torque changing time) for the torque command to change from $\tau_1$ to $\tau_2$. In order to prevent breaking that becomes easy to occur after the strength of the electrode wire 1 rapidly decreases due to the increase in temperature of the electrode wire 1, it is preferable to reduce the torque command early. Therefore, it is desirable to set $t_2$ to a shorter time. Thus, $t_2$ is determined by performing experiments in advance such that it is a shorter time and deflection does not occur in the electrode wire 1. For example, it is satisfactory if the torque changing time is gradually increased starting from a small value, the time after which no deflection of the electrode wire 1 occurs for the first time is set as $t_2$, and $t_2$ is stored in advance in a storing unit 17.

On the other hand, as illustrated in FIG. 8-2, when the temperature of the electrode wire 1 becomes high due to heating, the tension applied to the electrode wire 1 is reduced from the tension that has been applied to the electrode wire 1, whereby it is possible to prevent breaking of the electrode wire 1 that occurs due to the decrease in strength with the increase in temperature of the electrode wire 1. Moreover, because the tension can continue to be applied to the electrode wire 1, the electrode wire 1 can be sufficiently straightened. In the example in FIG. 8-2, the tension applied to the electrode wire 1 is reduced after the time $t_1$.

Figure 4:
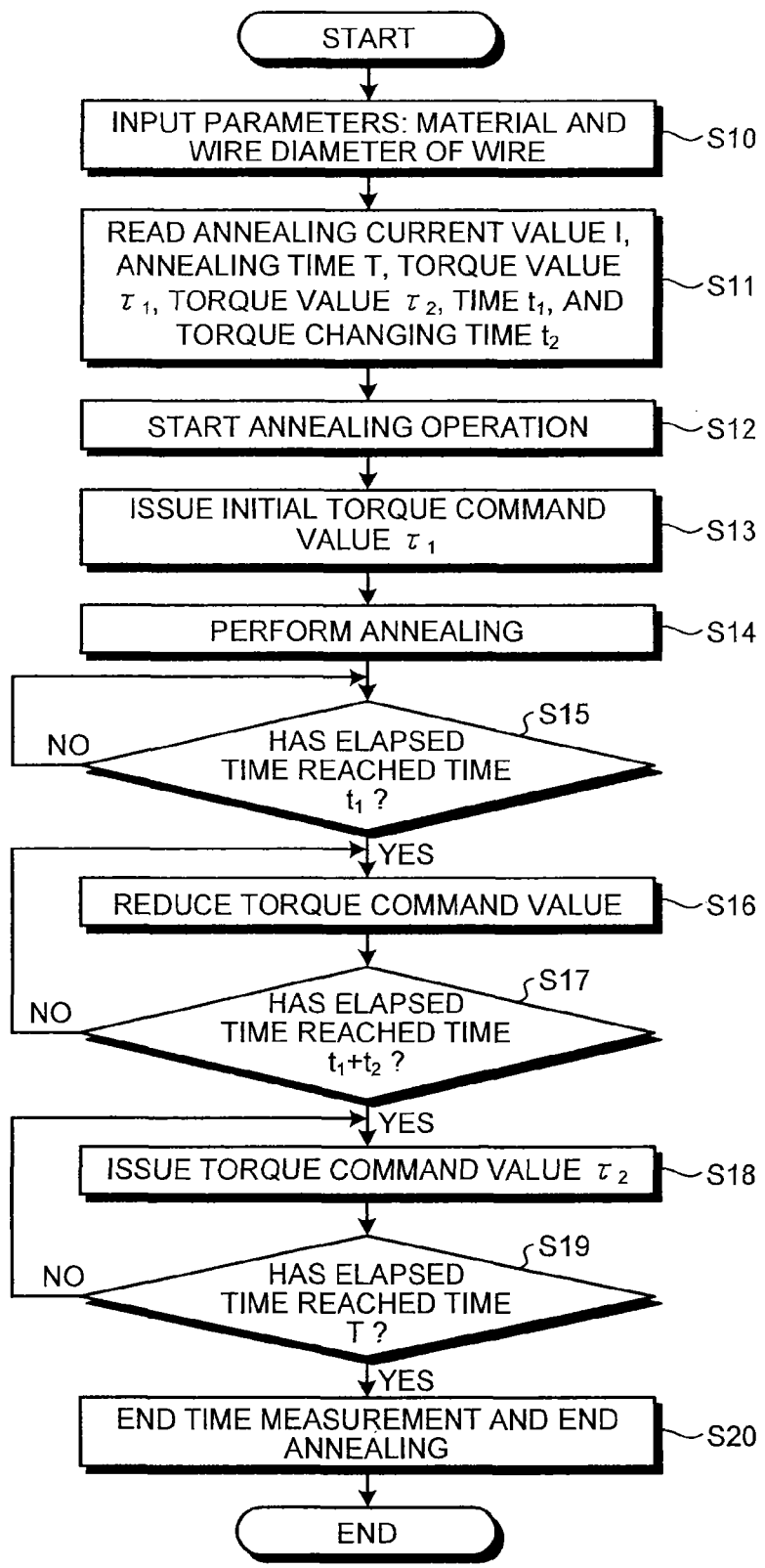
FIG. 4 is a diagram illustrating a flowchart for explaining the sequence of a process performed by a control device according to a first embodiment.

Next, the sequence in annealing described above is illustrated in FIG. 4. In FIG. 4, first, parameters are input on the setting screen of the wire electrical discharge machine (Step S10). The input parameters are the material and wire diameter of the electrode wire 1.

Thereafter, the annealing current value I, the annealing time T, the torque value $\tau_1$ when annealing is started, the torque value $\tau_2$ when annealing ends, the time $t_1$ during which the torque value $\tau_1$ is applied, and the torque changing time $t_2$ are read from the storing unit 17. These are values in accordance with the set parameters. (Step S11). The parameters, such as the annealing current value I, the annealing time T, and the set value of each torque, are preset as the conditions to straighten the electrode wire 1. Moreover, each set value and the like are read by the torque control device 3 and the power supply control device 6.

Next, the annealing operation is started (Step S12), and the tension setting roller 2 is driven by the torque command value $\tau_1$ set by the torque control device 3 (Step S13). Next, the current of the annealing current value I set by the power supply control device 6 is applied to the electrode wire 1 and measurement of the elapsed time is started, whereby annealing is performed (Step S14).

Next, it is determined whether the elapsed time since the current is applied to the electrode wire 1 has reached the time $t_1$, and when the elapsed time has not reached the time $t_1$ (No in Step S15), a process to determine that the elapsed time is false is repeated. When the time during which the current is applied to the electrode wire 1 has reached the time $t_1$ (Yes in Step S15), a process to determine that the elapsed time is true is performed and the torque command value from the torque control device 3 is gradually reduced (Step S16).

Next, it is determined whether the elapsed time since the current is applied to the electrode wire 1 has reached the time $t_1+t_2$, and when the elapsed time has not reached the time $t_1+t_2$ (No in Step S17), a process to determine that the elapsed time is false is repeated. When the time during which the current is applied to the electrode wire 1 has reached the time $t_1+t_2$ (Yes in Step S17), the torque control device 3 issues a command of the final torque value command value $\tau_2$ (Step S18).

Figure 7:
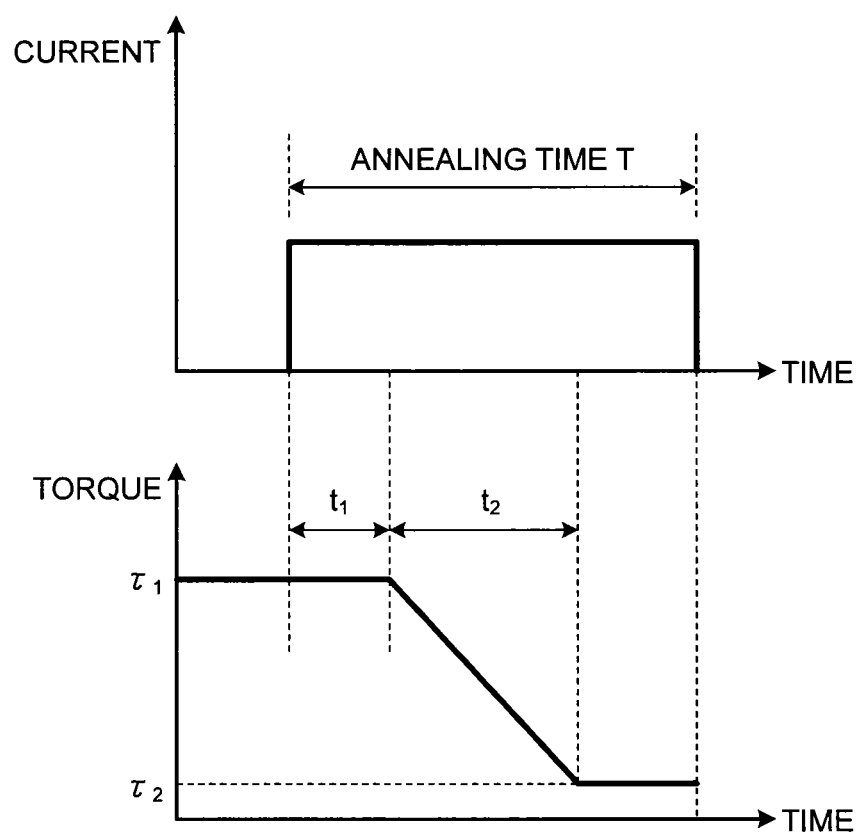
FIG. 7 is a time chart illustrating the relationship between the torque command given to a tension setting roller 2 from a torque control device and the current that is applied to an electrode wire in accordance with the elapsed time.

Next, it is determined whether the elapsed time since the current is applied to the electrode wire 1 has reached the annealing time T, and when the elapsed time has not reached the annealing time T (No in Step S19), a process to determine that the elapsed time is false is repeated. When the elapsed time has reached the annealing time T (Yes in Step S19), the application of the current to the electrode wire 1 is stopped and thus annealing ends (Step S20). FIG. 7 is a time chart illustrating the relationship between the torque command given to the tension setting roller 2 from the torque control device 3 and the current that is applied to the electrode wire 1 in accordance with the elapsed time.

As described above, in the first embodiment, breaking of the electrode wire 1 can be prevented by changing the set torque in accordance with the elapsed time of the annealing process. The number of times the torque applied to the tension setting roller 2 is changed is not limited to once as illustrated in the first embodiment and may be set finely for each stage in the annealing operation such that the torque is changed a plurality of times.

Moreover, during the annealing operation, in order to make it difficult to cause deflection of the electrode wire 1 due to the thermal expansion caused by the increase in temperature of the electrode wire 1, the torque applied to the tension setting roller 2 is set large for a predetermined time after the annealing process is started. Then, after the temperature increases, the tension is set low so that the electrode wire 1 of reduced strength is not broken. Therefore, the annealing process can be performed at a sufficiently high temperature in a state where the tension is applied to the electrode wire 1 such that the electrode wire 1 is straight. Thus, the straightness of the electrode wire 1 can be stably improved and the performance of the automatic connecting device can be improved.

Second Embodiment

Figure 5:
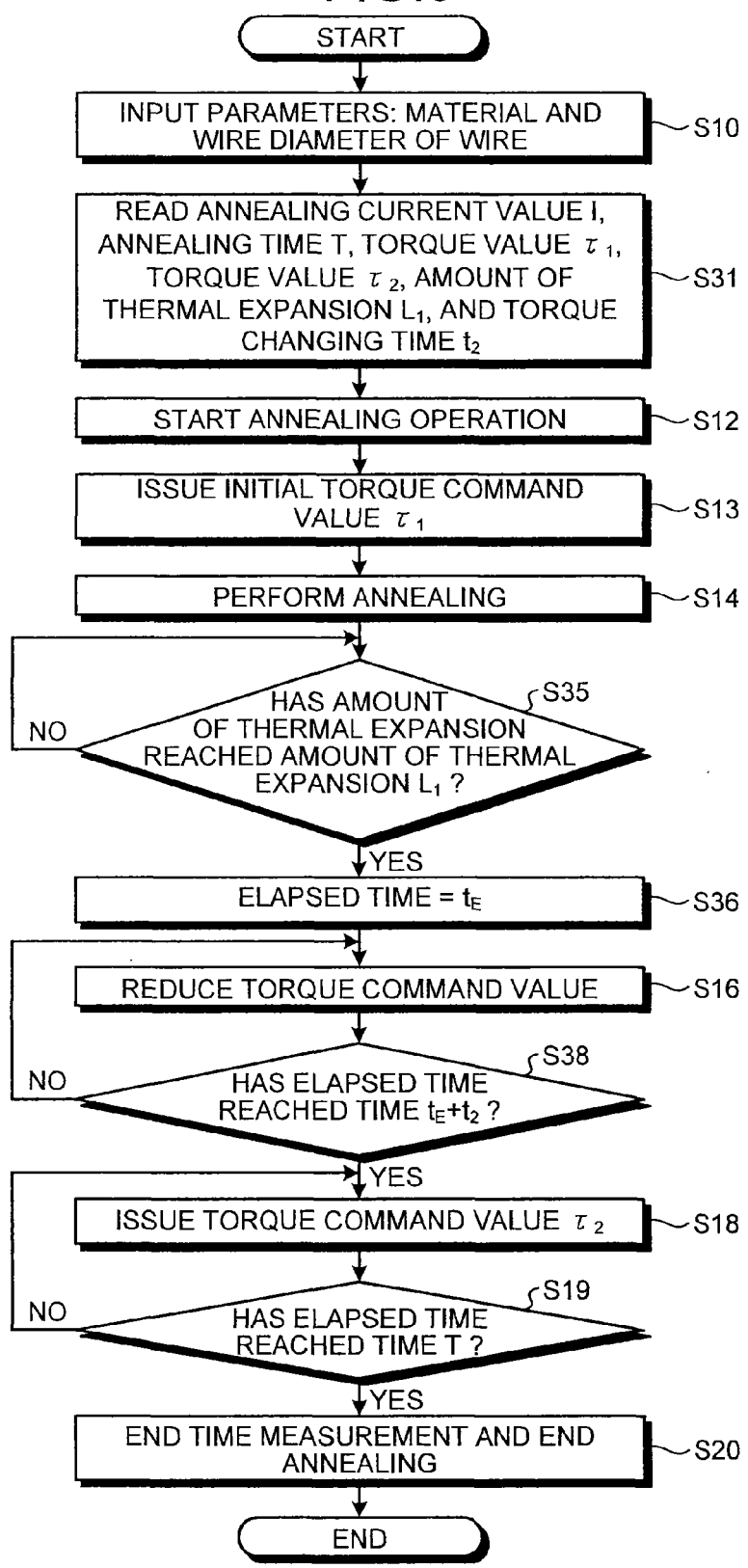
FIG. 5 is a diagram illustrating a flowchart for explaining the sequence of a process performed by a control device according to a second embodiment.

FIG. 5 is a diagram illustrating a flowchart for explaining the sequence of a process performed by a control device according to the second embodiment. In the first embodiment, the timing at which the torque command from the torque control device 3 is lowered from the initial torque value $\tau_1$ is determined on the basis of the elapsed time since the current is applied to the electrode wire 1. In contrast, in the second embodiment, the configuration is such that when the amount of expansion of the electrode wire 1 has reached a predetermined amount of thermal expansion $L_1$, the torque command value is changed from the initial torque. Configurations that are the same as those in the first embodiment are given the same reference numerals and a detailed explanation thereof is omitted.

When the tension of the initial torque value continues to be applied to the electrode wire 1, the tension setting roller 2 rotates by rolling up the amount of thermal expansion of the electrode wire 1. It is possible to detect the amount of thermal expansion of the electrode wire 1 by detecting the amount of rotation of the tension setting roller 2 by using an encoder or the like of the tension setting roller 2. In other words, in this example, the encoder functions as an expansion detecting unit. It is satisfactory if the expansion detecting unit can detect the amount of expansion of the electrode wire 1, and the expansion detecting unit is not limited to an encoder.

Then, when the detected amount of thermal expansion has reached the predetermined amount of thermal expansion $L_1$ of the electrode wire 1, the torque command from the torque control device 3 is changed so as to reduce the tension applied to the electrode wire 1. Moreover, it is possible to define the time until the amount of thermal expansion detected after the current starts to be applied reaches $L_1$ as $t_E$, and change the torque command given to the tension setting roller 2 from the torque control device 3 from $\tau_1$ as follows:

$$\tau = \begin{cases} \tau_1 & (\text{amount of expansion} \leq L_1) \\ \tau_1(\tau_1 - \tau_2) \times (t - t_1)/t_2 & (t_1 \leq t_E + t_2) \\ \tau_2 & (t_E + t_2 < t \leq T) \end{cases} \quad (8)$$

In the second embodiment, as illustrated in FIG. 5, instead of performing Step S11 illustrated in FIG. 4, the amount of thermal expansion $L_1$, which is preset in accordance with the material and wire diameter of the electrode wire 1, is also read from the storing unit 17 (Step S31). Moreover, instead of performing Step S15 illustrated in FIG. 4, when the amount of expansion of the electrode wire 1 has reached $L_1$ (Yes in Step S35), the elapsed time $t_E$ at this point is recorded (Step S36). Moreover, instead of performing Step S17 illustrated in FIG. 4, it is determined whether the elapsed time since the current is applied to the electrode wire 1 has reached the time $t_E+t_2$ (Step S38).

As described above, in the second embodiment, because the torque is changed on the basis of the amount of thermal expansion of the electrode wire 1, the electrode wire 1 can be prevented from being broken due to the continuous application of tension more than necessary to the electrode wire 1 whose strength is reduced due to the increase in temperature. Moreover, the time and effort to set the elapsed time until the torque is changed can be omitted.

Third Embodiment

Figure 6:
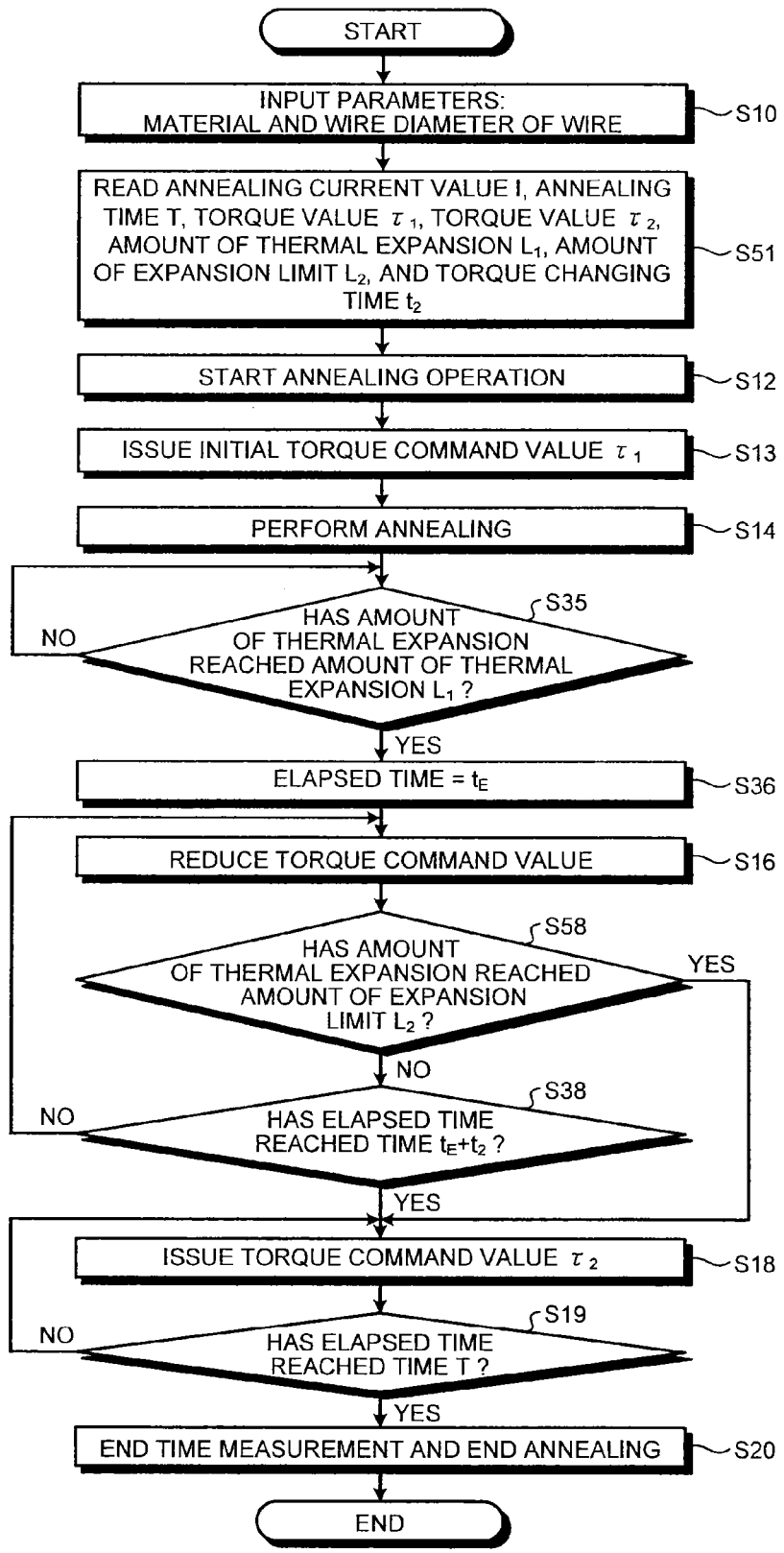
FIG. 6 is a diagram illustrating a flowchart for explaining the sequence of a process performed by a control device according to a third embodiment.

FIG. 6 is a diagram illustrating a flowchart for explaining the sequence of a process performed by a control device according to a third embodiment. In the first embodiment and second embodiment, the changing time $t_2$, which is until the torque command from the torque control device 3 is changed from the initial torque value $\tau_1$ to the final torque value $\tau_2$, is set; however, in addition to this, if the amount of expansion of the electrode wire 1 has reached a predetermined amount of expansion limit $L_2$ before the elapsed time (elapsed time after $t_1$) since the changing of the torque value is started reaches the set torque changing time $t_2$, the torque command value is immediately changed to $\tau_2$.

Specifically, the amount of thermal expansion of the electrode wire 1 is detected by detecting the amount of rotation of the tension setting roller 2 by using an encoder or the like of the tension setting roller 2. When the detected amount of expansion has reached the predefined amount of expansion limit $L_2$ of the electrode wire 1 before the elapsed time since the torque command from the torque control device 3 starts to be changed reaches the set torque changing time $t_2$, the torque command from the torque control device 3 is immediately changed from the current command value to $\tau_2$, thereby terminating changing of the torque.

In the third embodiment, as illustrated in FIG. 6, instead of performing Step S31 illustrated in FIG. 5, the predetermined amount of expansion limit $L_2$ of the electrode wire 1 in accordance with the material and wire diameter of the electrode wire 1 is read from the storing unit of the wire electrical discharge machine (Step S51). Moreover, before the elapsed time since changing of the torque is started reaches the set changing time $t_2$, i.e., before determining whether the elapsed time since the current is applied to the electrode wire 1 has reached the time $t_E+t_2$ (Step S38), the timing at which changing of the torque is terminated is determined based on whether the electrode wire 1 has reached the amount of expansion limit $L_2$ (Step S58).

As described above, in the third embodiment, the timing at which the torque is changed is determined on the basis of not only the elapsed time since annealing is started but also the amount of thermal expansion of the electrode wire 1; therefore, the electrode wire 1 can be prevented from over expanding or breaking.

Fourth Embodiment

Figure 11:
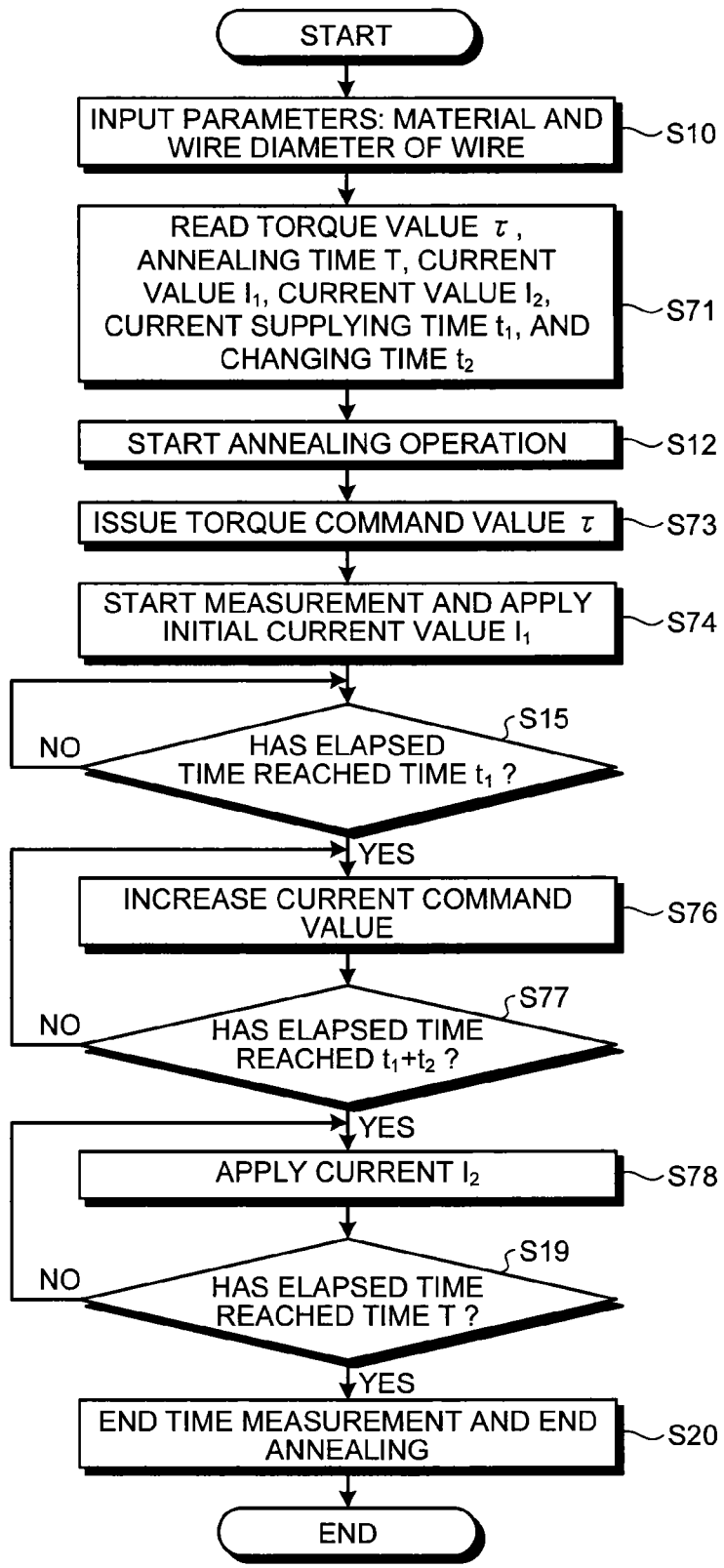
FIG. 11 is a diagram illustrating a flowchart for explaining the sequence of a process performed by a control device according to a fourth embodiment.

FIG. 11 is a diagram illustrating a flowchart for explaining the sequence of a process performed by a control device according to the fourth embodiment. In the first, second, and third embodiments, the set torque is changed after annealing is started and the current during the annealing process has a constant value. In contrast, in the fourth embodiment, the set torque of the tension setting roller 2 is made constant and the annealing process is performed such that the electrode wire 1 is not easily deflected by controlling the current applied to the electrode wire 1 by the power supply control device 6.

When the electrode wire 1 is annealed, as illustrated in FIG. 2-2, in the case where the current that is applied to the electrode wire 1 is constant, the thermal expansion rate first increases rapidly. Then, the thermal expansion rate gradually decreases with the increase in temperature of the electrode wire 1, and the thermal expansion acceleration a also becomes negative.

The strength of the electrode wire 1 decreases with the increase in temperature due to heating; therefore, if the initial torque is set too high, the electrode wire 1 is broken. In order to prevent breaking, the torque τ that is first applied to the tension setting roller 2 needs to be set small. As represented by Equation (5), if the acceleration a of the thermal expansion of the electrode wire 1 is low, the electrode wire 1 can be prevented from being deflected even if the torque τ applied to the tension setting roller 2 is set small.

Moreover, because the acceleration a of the thermal expansion changes depending on the degree of heating by the annealing current, if the current that is applied to the electrode wire 1 from the power supply control device 6 is made small, the torque τ applied to the tension setting roller 2 can be set small. Thus, in order to prevent the wire from becoming slack during heating and prevent breaking due to an excessive torque, the current that is first applied to the electrode wire 1 from the power supply control device 6 in the annealing process is set small.

On the other hand, in order to improve the straightness of the electrode wire 1, the annealing process needs to be performed on the electrode wire 1 at a sufficiently high temperature. Thus, the current value I supplied to the electrode wire 1 by the power supply control device 6 is changed. The current that is first applied to the electrode wire 1 is set to a small value so that the temperature immediately after the current starts to be applied is prevented from increasing rapidly. Therefore, even if the torque τ applied to the tension setting roller 2 is set small, the thermal expansion due to the heating can be rolled up.

Thereafter, the current supplied to the electrode wire 1 is gradually increased to a preset annealing current in accordance with the material and wire diameter of the electrode wire 1 while continuing to apply the constant torque τ to the tension setting roller 2, thereby enabling the temperature of the electrode wire 1 to increase sufficiently.

In other words, the thermal expansion acceleration due to the increase in temperature of the electrode wire 1 can be made lower than the acceleration of the tension setting roller 2; therefore, the thermal expansion due to the heating of the electrode wire 1 can be completely rolled up by the rotation of the tension setting roller 2.

After reaching a predetermined elapsed time since the annealing process is started, the current is increased until the annealing current in accordance with the material and wire diameter of the electrode wire 1 is reached and thus the temperature of the electrode wire 1 can be sufficiently increased. The thin electrode wire 1 of φ0.1 mm or less, which is particularly easily broken, can be prevented from being broken. Therefore, the annealing process can be performed at a sufficiently high temperature in a state where the tension is applied to the electrode wire 1 such that the electrode wire 1 is straight. Thus, the straightness of the electrode wire 1 can be stably improved and the performance of the automatic connecting device can be improved.

For example, the current command supplied to the electrode wire 1 from the power supply control device 6 is changed as follows:

$$I = \begin{cases} I_1 & (t \le t_1) \\ I_1 + (I_2 - I_1) \times (t - t_1)/t_2 & (t_1 < t \le t_1 + t_2) \\ I_2 & (t_1 + t_2 < t \le T) \end{cases} \quad (9)$$

where $I_1$ is the current (heating current) when annealing is started, T is the time between the start and end of annealing, and $I_2$ is the current (annealing current) when annealing ends. $I_2$ is the annealing current preset in accordance with the material and wire diameter of the electrode wire 1. Setting of $t_1$ (first set time) and $t_2$ (second set time) will be described below.

$t_1$ is the time from when the annealing process is started to when changing of the current command is started. In order to shorten the annealing time as much as possible, it is desirable to set $t_1$ small. For example, $t_1$ is set to 0. However, as illustrated in FIG. 2-3, the thermal expansion acceleration a when the current of the annealing current value $I_1$ is applied to the electrode wire 1 first becomes high. Therefore, when the difference between and $\tau_2$ is not large, if $t_1$ is set small such that the current command is changed before the thermal expansion acceleration a becomes negative, the thermal expansion acceleration a becomes higher. As a result, as represented by Equation (5), the torque applied to the tension setting roller 2 necessary to prevent the electrode wire 1 from being deflected becomes larger than the constant torque value τ that is continuously applied to the tension setting roller 2 in the present embodiment. Therefore, the electrode wire 1 is deflected.

Figure 13:
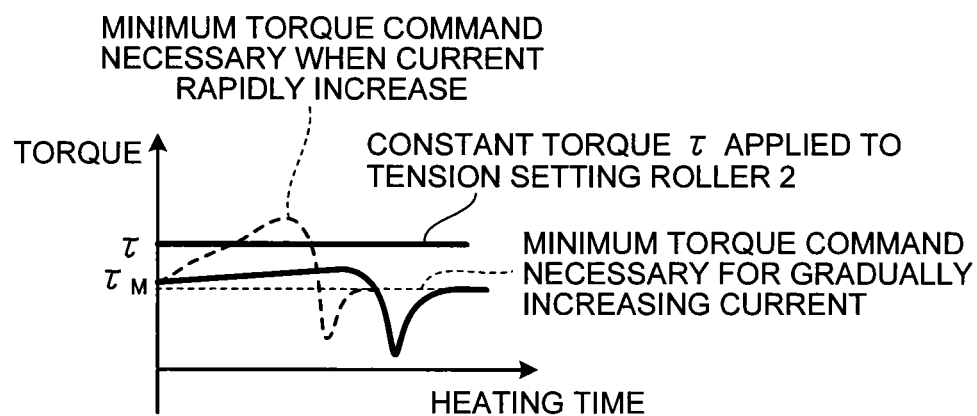
FIG. 13 is a comparison diagram of the torque command value from a control device between the case where the current that is applied to an electrode wire is rapidly increased and the case where the current that is applied to an electrode wire is gradually increased for preventing deflection of an electrode wire when the current during annealing is variable.

$t_2$ is the changing time for the current command to change from $I_1$ to $I_2$. In order to shorten the annealing time as much as possible, it is desirable to set $t_2$ small. However, if $t_2$ is set too small, the current command increases rapidly; therefore, the thermal expansion acceleration a of the electrode wire 1 becomes high. As represented by Equation (5), when the current increases rapidly, the minimum torque command given to the tension setting roller 2 necessary to prevent the electrode wire 1 from being deflected becomes high. As a result, in FIG. 13, although the "constant torque τ applied to the tension setting roller 2" needs to be always larger than the "minimum torque command necessary when the current increases rapidly", there is a portion (moment) in which the "minimum torque command necessary when the current increases rapidly" is larger than the "constant torque τ applied to the tension setting roller 2" and the electrode wire 1 is deflected in the portion (moment).

Thus, in the fourth embodiment, the tension setting roller 2 is driven by the torque τ, and $t_2$ is set such that the expansion acceleration of the electrode wire 1 satisfies Equation (5) while the current applied to the electrode wire 1 is increased until the annealing current is reached as represented by Equation (9).

Specifically, when the tension setting roller 2 is driven by the constant torque τ, in order to prevent the electrode wire 1 from being deflected, the acceleration a of the thermal expansion of the electrode wire 1 is represented by the following equation, which is derived from Equation (5).

$$a \le (\tau - \tau_M) \times R/J \quad (10)$$

The maximum value $a_{max}$ of the acceleration a of the thermal expansion of the electrode wire 1 is represented by the following equation, which is derived from Equation (10).

$$a_{max} = (\tau - \tau_M) \times R/J \quad (11)$$

Figures 1, 10:
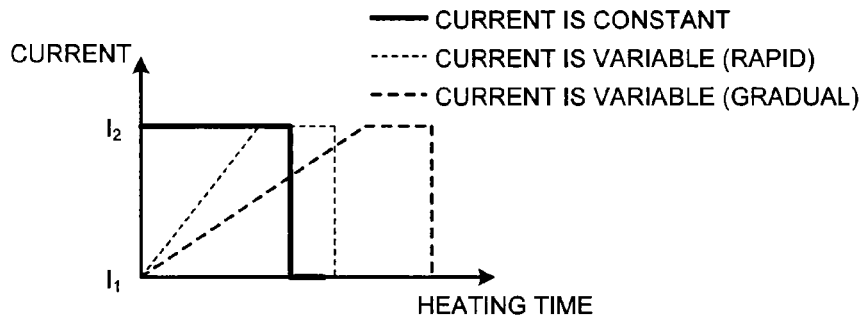
Figures 2, 10:
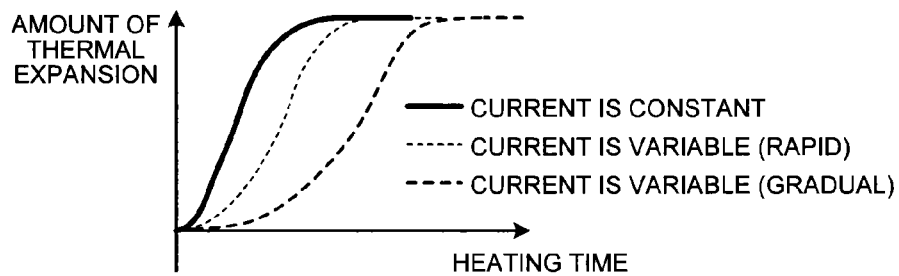
Figures 3, 10:
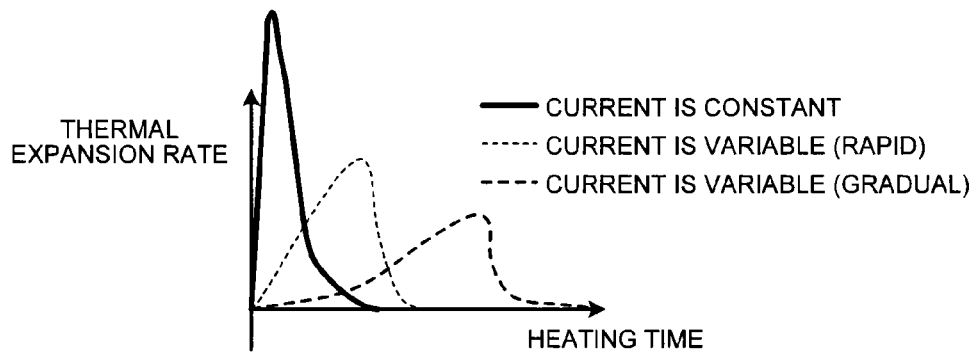
Figures 4, 10:
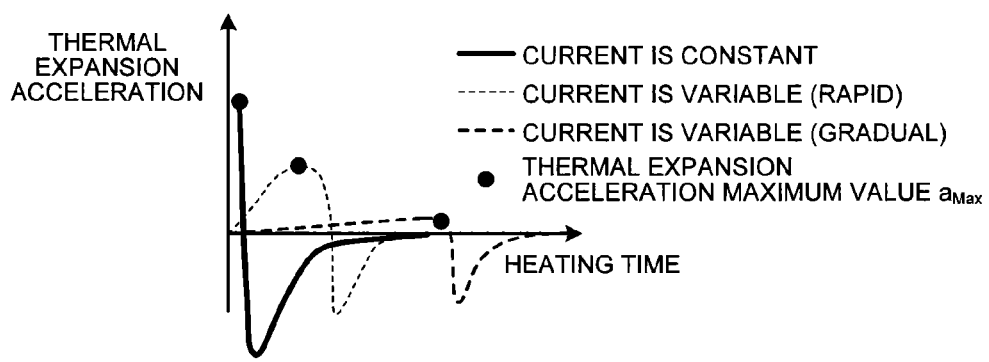
Figure 14:
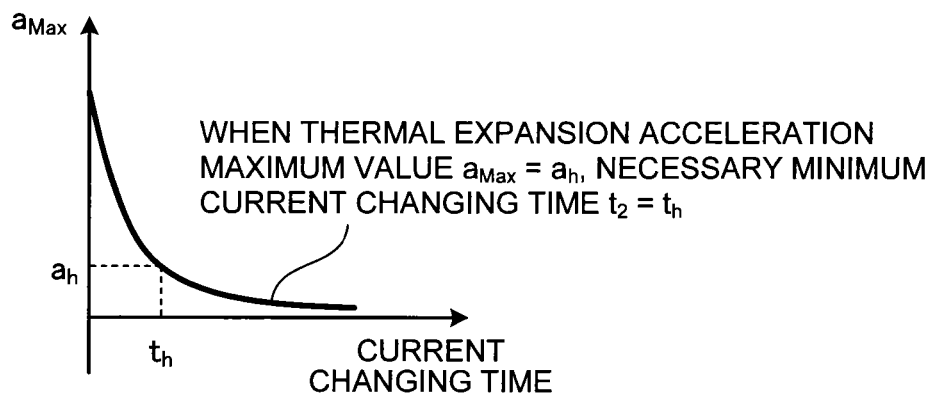
FIG. 14 is a diagram illustrating the relationship between the maximum value $a_{max}$ of the thermal expansion acceleration due to the increase in temperature when an electrode wire is heated and the current changing time when the current during annealing is variable.

On the other hand, FIGS. 10-2 to 10-4 are comparison diagrams of the amount of thermal expansion, the thermal expansion rate, and the thermal expansion acceleration among the case where the current during the annealing process is constant, the case where the annealing current is rapidly increased by reducing $t_2$ in Equation (9), and the case where the annealing current is gradually increased by increasing $t_2$ in Equation (9). As illustrated in FIG. 10-4, if the time during which the current applied to the electrode wire 1 is changed from $I_1$ to $I_2$ is increased, the maximum value $a_{max}$ of the acceleration a of the generated thermal expansion of the electrode wire 1 becomes small. Therefore, the relationship between the maximum value $a_{max}$ of the thermal expansion acceleration due to the increase in temperature when the electrode wire is heated by the annealing current that is changed as represented by Equation (9) and the current changing time is as illustrated in FIG. 14.

In order to prevent the electrode wire 1 from being deflected, for setting the changing time $t_2$, the maximum value of the acceleration a of the thermal expansion of the electrode wire 1 is obtained from Equation (11) on the basis of the set torque τ of the tension setting roller 2 and the obtained value is defined as $a_h$. As illustrated in FIG. 14, when the time corresponding to the maximum value $a_h$ of the acceleration a of the thermal expansion of the electrode wire 1 is defined as $t_h$, $t_2$ is set to $t_h$ or a value larger than $t_h$ and is prestored in the storing unit 17.

As illustrated in FIG. 11, instead of performing Step S11 illustrated in FIG. 4, the above process is performed by also reading the current values $I_1$ and $I_2$ and the time $t_1$ and $t_2$ from the storing unit 17 (Step S71). Moreover, instead of performing Step S13 illustrated in FIG. 4, the tension setting roller 2 is driven by the torque τ (Step S73). Moreover, instead of performing Step S14 illustrated in FIG. 4, the annealing process is performed by applying the current of $I_1$ to the electrode wire 1 and starting measurement of the elapsed time (Step S74).

Moreover, instead of performing Step S16 to Step S18 illustrated in FIG. 4, when the time during which the current is applied to the electrode wire 1 has reached $t_1$ (Yes in Step S15), the power supply control device 6 increases the command value of the current applied to the electrode wire 1 (Step S76). Then, when the time during which the current is applied to the electrode wire 1 has reached $t_1+t_2$ (Yes in Step S77), the power supply control device 6 applies the final current value $I_2$ to the electrode wire 1 (Step S78).

Next, it is determined whether the elapsed time since the current is applied to the electrode wire 1 has reached the annealing time T, and when the elapsed time has not reached the annealing time T (No in Step S19), a process to determine that the elapsed time is false is repeated. When the elapsed time has reached the annealing time T (Yes in Step S19), the application of the current to the electrode wire 1 is stopped and thus the annealing process ends (Step S20).

Figure 9:
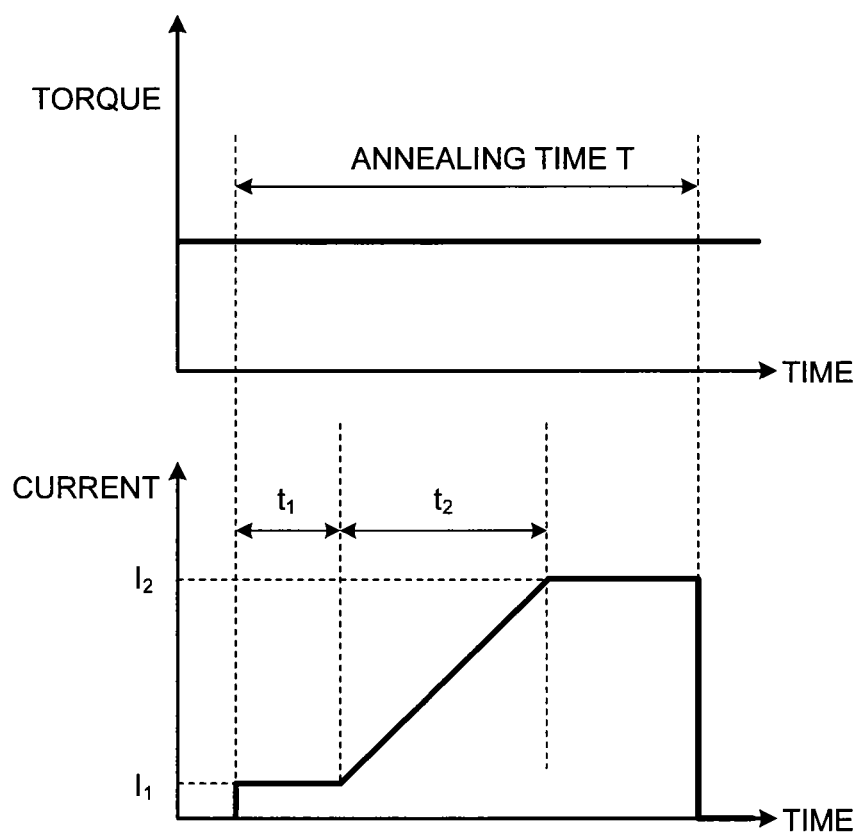
FIG. 9 is a time chart illustrating the relationship between the current command of a power supply control device and the torque command value from the torque control device in accordance with the elapsed time, in the case where the current that is applied to an electrode wire is gradually increased.

FIG. 9 is a time chart illustrating the relationship between the current supplied to the electrode wire 1 from the power supply control device 6 and the torque command given to the tension setting roller 2 from the torque control device 3 in accordance with the elapsed time.

The annealing process described above prevents, by gradually increasing the current that is applied to the electrode wire 1 starting from a low value, the electrode wire 1 from being broken. Therefore, the annealing can also be performed on the thin electrode wire 1 of ϕ0.1 mm or less, which is particularly easily broken.

On the other hand, when the electrode wire 1 that has a high strength and is not easily broken, for example, the electrode wire 1 of ϕ0.2 mm or more, is used, an increase in temperature when a constant current is applied is more gradual compared with the case of a thin wire; therefore, the time until the temperature is stabilized around a constant value becomes relatively long. In such a case, the temperature of the electrode wire 1 can be increased in a short time by increasing the current that is first applied to the electrode wire 1 such that it is larger than the conventional technologies. Then, after a lapse of a predetermined time, the current is gradually reduced to the annealing current that is preset in accordance with the material and wire diameter of the electrode wire 1, whereby the time required for annealing can be shortened.

For example, when the wire diameter of the electrode wire 1 is a predetermined value (for example, a value less than 0.2 mm), the power control as illustrated in FIG. 9 is applied. When the wire diameter of the electrode wire 1 is equal to or greater than a predetermined value, the configuration may be such that the power control is applied such that current larger than the annealing current value is first applied and the current is reduced until the annealing current value is reached in accordance with the elapsed time.

As described above, in the fourth embodiment, when the annealing process is performed, the set current can be changed in accordance with the elapsed time since the annealing process is started. Therefore, in the case of the thin electrode wire 1, which is easily broken, the current that is applied to the electrode wire 1 when the annealing process is performed is gradually increased starting from a low value, thereby preventing the electrode wire 1 from being broken. In the case of the thin electrode wire 1 of ϕ0.1 mm or less, which is particularly easily broken, the annealing process can be performed at a sufficiently high temperature in a state where the electrode wire 1 is straight while preventing breaking.

On the other hand, when the electrode wire 1 that has a high strength and is not easily broken, for example, the electrode wire 1 of ϕ0.2 mm or more, is used, the temperature of the electrode wire 1 can be increased in a short time by first applying a large current to the electrode wire 1. Then, after a lapse of a predetermined time, the current is gradually reduced to the annealing current that is preset in accordance with the material and wire diameter of the electrode wire 1, whereby the annealing time can be shortened.

The timing at which the current is changed may be determined on the basis of the amount of thermal expansion of the electrode wire 1 in a similar manner to the second embodiment or on the basis of both the elapsed time and the amount of thermal expansion in a similar manner to the third embodiment.

Fifth Embodiment

In the first, second, and third embodiments, the set torque is changed after the annealing process is started and the current is a constant value during annealing. In the fourth embodiment, the set torque of the tension setting roller 2 is a constant value and the current is changed during annealing.

In contrast, in the fifth embodiment, the electrode wire 1 is annealed by changing the set torque of the tension setting roller 2 by the torque control device 3 as described in the first, second, and third embodiments and by changing the current that is applied to the electrode wire 1 by the power supply control device 6 as described in the fourth embodiment.

In the fourth embodiment, when the electrode wire 1 is a thin wire, the electrode wire 1 is slowly heated; therefore, although the annealing time becomes long in some cases, the annealing time can be shortened by combining the torque controls described in the first, second, and third embodiments. For example, the current that is first applied immediately after annealing is started is made large and the initial set torque of the tension setting roller 2 is also made large compared with the case illustrated in the fourth embodiment.

Although expansion of the electrode wire 1 immediately after the annealing process is started becomes large compared with the fourth embodiment, the initial set torque is also set large; therefore, the expansion can be rolled up by the tension setting roller 2. Then, when a predetermined time has elapsed since the annealing process is started or when the amount of thermal expansion of the electrode wire 1 has reached a predetermined amount of expansion, it is satisfactory if the current to be applied is further increased and the set torque is reduced. By performing the annealing process in the above manner, the time required for the entire annealing can be shortened.

INDUSTRIAL APPLICABILITY

As described above, the automatic wire connecting device according to the present invention is useful for straightening the electrode wire and is particularly suitable for straightening the electrode wire in the wire electrical discharge machine.

REFERENCE SIGNS LIST 1 electrode wire
2 tension setting roller (tension applying unit)
3 torque control device (tension control unit)
4 pinch roller
5 heating current electrode (heating electrode)
6 power supply control device (power supply control unit)
8 cutting electrode
9 upper wire guide
10 lower wire guide
11 upper power feed contact
12 lower power feed contact
13 bobbin
14 lower guide roller
15 GND electrode
17 storing unit
18 workpiece

The invention claimed is:
1. An automatic wire connecting device that performs a heating process while applying a tension to an electrode wire, comprising:
 a heating electrode that heats the electrode wire by applying a current to the electrode wire;
 a tension applying unit that applies the tension to the electrode wire to which the current is applied by the heating electrode;

a tension control unit that controls the tension applied by the tension applying unit; and a power supply control unit that applies a heating current smaller than a preset annealing current to the electrode wire until a first set time elapses since the current starts to be applied and gradually increases the current applied to the electrode wire to reach the annealing current during a second set time after the first set time elapses since the current starts to be applied.

2. The automatic wire connecting device according to claim 1, wherein the first set time is a time during which the heating current is applied to the electrode wire such that the tension is always applied to the electrode wire while the heating current is applied to the electrode wire, and the second set time is a time during which the current is applied to the electrode wire such that the tension is always applied to the electrode wire until the current applied to the electrode wire is increased to the annealing current.

3. The automatic wire connecting device according to claim 1, wherein the first set time and the second set time are determined on a basis of a maximum thermal expansion acceleration when the electrode wire is heated, and the maximum thermal expansion acceleration is obtained on a basis of a torque command of the tension control unit and a value of a friction torque of the tension applying unit.

4. The automatic wire connecting device according to claim 3, wherein the tension applying unit is a roller that winds up the electrode wire, and the maximum thermal expansion acceleration that is defined as $a_h$ is obtained on a basis of the following equation:

$$a_h = (\tau - \tau_M) R / J$$

where J is a moment of inertia of the roller, R is a radius of the roller, $\tau$ is the torque command, and $\tau_M$ is the value of the friction torque.

5. The automatic wire connecting device according to claim 1, wherein the tension control unit reduces the tension at a predetermined timing.

6. The automatic wire connecting device according to claim 5, further comprising an expansion detecting unit that detects an amount of thermal expansion of heated electrode wire, wherein the predetermined timing is a time at which elapsed time since current starts to be applied to the electrode wire has reached a predetermined time or a time at which an amount of thermal expansion of the electrode wire has reached a predetermined amount of expansion, whichever is earlier.

7. The automatic wire connecting device according to claim 1, wherein the tension applying unit is a roller that winds up the electrode wire, and the tension control unit drives the roller by a torque command such that the tension is always applied to the electrode wire on a basis of a thermal expansion acceleration of the electrode wire and a value of a friction torque of the tension applying unit.

8. The automatic wire connecting device according to claim 1, wherein when a wire diameter of the electrode wire is less than a predetermined value, the power supply control unit performs control of applying a heating current smaller than the annealing current to the electrode wire until the first set time elapses since the current starts to be applied and increasing the current applied to the electrode wire to reach the annealing current during the second set time after the first set time elapses since the current starts to be applied, and when the wire diameter of the electrode wire is equal to or more than a predetermined value, the power supply control unit performs control of applying a heating current larger than the annealing current to the electrode wire when the current starts to be applied and reducing the heating current to reach the annealing current in accordance with an elapsed time.

* * * * *